No. 840,245. PATENTED JAN. 1, 1907.
M. J. OWENS.
GLASS TANK.
APPLICATION FILED NOV. 21, 1904.
2 SHEETS—SHEET 1.
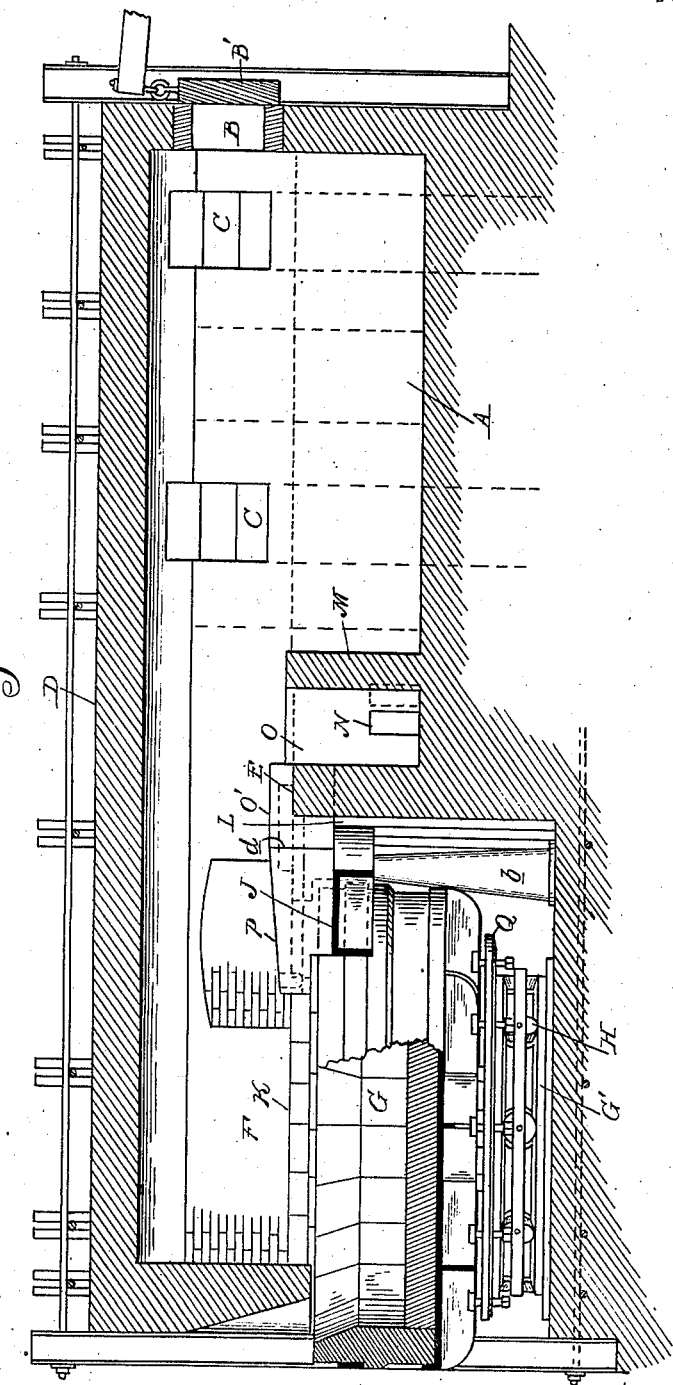
WITNESSES
INVENTOR
MICHAEL J. OWENS
BY
ATT'Y.

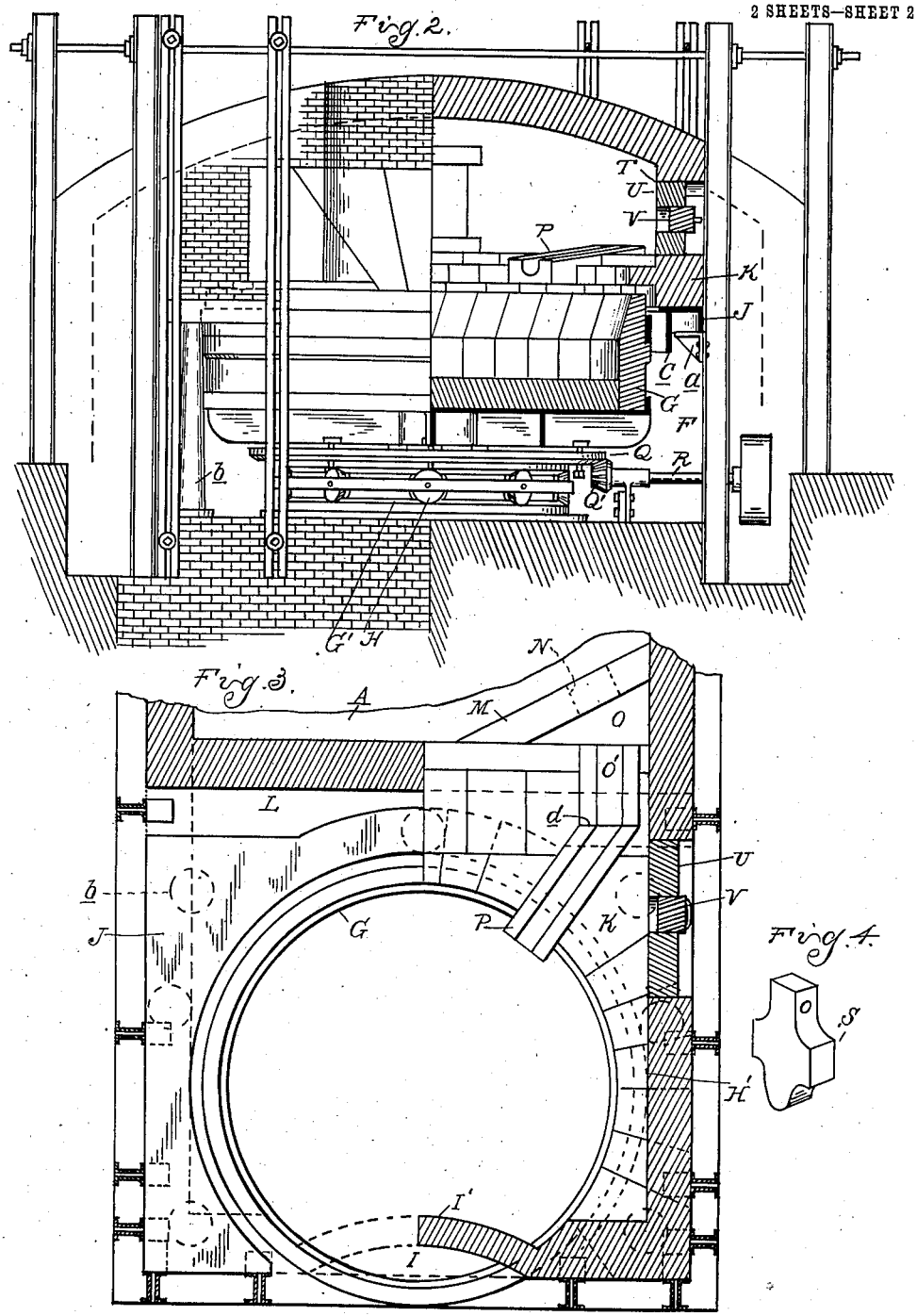

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

GLASS-TANK.

No. 840,245.    Specification of Letters Patent.    Patented Jan. 1, 1907.

Application filed November 21, 1904. Serial No. 233,678.

*To all whom it may concern:*

Be it known that I, MICHAEL J. OWENS, a citizen of the United States, residing at Toledo, in the county of Lucas and State of Ohio, have invented certain new and useful Improvements in Glass-Tanks, of which the following is a specification, reference being had therein to the accompanying drawings.

The invention consists in the construction of a glass-melting tank and a working tank with a connecting-conduit, and, further, in the construction, arrangement, and combination of the various parts, as more fully hereinafter described, and particularly pointed out in the claims.

In the drawings, Figure 1 is a vertical central longitudinal section through the melting and working tank embodying my invention. Fig. 2 is a front elevation, half in section, the section being taken centrally through the working tank. Fig. 3 is a horizontal section above the working tank, showing part of the melting-tank and showing one-half of the forehearth with the bricks removed therefrom. Fig. 4 is a perspective of the valve used in controlling the flow of glass from one tank to the other.

A represents a continuous melting-tank having an inlet B, controlled by a door B', for feeding in the batch which is to be melted.

C represents the inlets for the gas for combustion at the sides; D, the roof or top. It will be observed that this top or roof extends for some distance beyond the front wall E of the tank, forming a supplemental heating-chamber F in such extension beyond the tank itself over another tank, which I shall call for convenience the "working" tank G. This working tank is a rotary tank and is supported in this instance upon a track G' with interposed rollers H. The rotary tank is of such size as to be entirely within the supplemental heating-chamber F, except at one edge, where it projects outside, as shown at I. This outward extension of the tank I preferably provide by making an inwardly-curved front wall I', as shown in Fig. 3.

The rotary tank G being smaller than the supplemental heating-chamber F, I form a forehearth H' between the side walls thereof and the working tank. This forehearth preferably consists of a metal frame J, supported in any suitable manner—for instance, on the brackets *a* and the posts *b*. (Shown in Fig. 1 and in dotted lines in Fig. 3.) On this metal frame, preferably strengthened by depending flanges *c*, I place a brick covering K, extending over the edge of the tank, as plainly shown in Fig. 2.

The metal frame does not extend entirely to the tank A, but is preferably separated a slight distance therefrom to leave an air-space L between and the bricks only extend over this space.

In the tank A, and preferably at one side or one corner, I arrange a cross-wall M. This cross-wall may extend only to near the bottom of the tank, so as to leave a passage-way beneath, or it may be provided with a connecting port or passage N, Fig. 1, so that the glass can flow from the melting-tank A into the chamber O, formed within the sides of the tank and this cross-wall. Leading from this chamber O, I arrange a discharge-spout. In this case I have shown it consisting of a grooved tile or brick O', extending to a point above the space L, and an inclined grooved tile or brick P, extending from the edge of the brick O' to a point above the tank. I preferably rest the brick P directly upon the metal frame J, so that it, in effect, forms a part of the forehearth. The grooves in the two bricks O' and P form, in effect, a continuous trough or spout leading from the chamber O and discharging into the tank G.

The tank G may be rotated by any suitable means. I have shown a beveled gear-ring Q on the under side of the tank, driven by a bevel-pinion Q' on the shaft R, Fig. 2, which may be driven from any suitable source of power.

The batch being fed from the door B' into the tank A is melted by the heat from the burning gases above and will seek its level in the tank A. The molten glass passing through the port or ports N in the cross-wall M will rise to a corresponding level in the chamber O. When the glass has risen to a point above the opening in the discharge trough or spout, it will flow from the chamber O through the grooves in the bricks O' and P and be discharged into the tank G and from which it may be taken out at the exposed point I of the said tank. The tank G being rotated, new portions of glass in the tank G will be exposed at the point I, so that a dipping or gathering operation will not chill the glass, and thus interfere with the succeeding operations. The glass chilled by the exposure at the point I and by the gathering operation will be reheated and remelted when the same is brought again into the chamber F by the rotation of the tank.

When it is desired to stop the flow of glass through the spout or trough, I insert a valve S in the groove of the trough, which I have found will effectually stop the flow. A suitable hand-hole V is provided at the side, so that this valve may be inserted. By arranging a joint $d$ between the bricks O' and P at a point in the space L any glass that may tend to flow through that joint will harden, as it is exposed to the atmospheric temperature, and effectually close up the joint. By making the trough in two sections in this way the device is more easily constructed and more readily repaired.

I preferably form in the side wall of the chamber F an arch T and then form below the arch an opening U. In the normal operation of the device this opening is bricked up; but when it is desired to replace the spout these bricks may be readily removed, and thus form a manhole through which the operator may enter to remove the bricks O' and P and insert new ones. These repairs are greatly facilitated by arranging the conduit between the two tanks at one side and adjacent to the manhole.

By arranging the common chamber forming the melting-tank A and the working tank G with the continuous roof or top D the heat from the melting-chamber will pass over into the chamber F above the working tank and furnish the necessary heat to maintain the glass at the desired plasticity for operating.

In this construction, in which the melting-tank discharges directly into the working tank, it is desirable to have the working tank of considerable depth—say eight inches or more—so that there will be sufficient body of glass in this tank to plain the glass.

What I claim as my invention is—

1. The combination with a glass-melting tank, of a rotary working tank adjacent thereto, a wall across one corner of said melting-tank having an aperture in its lower portion and forming a vertical conduit, a forehearth between said tanks, a trough forming a portion of said forehearth and extending from said conduit to a point above said working tank, and a common hood for said tanks, for the purpose described.

2. The combination with a glass-melting tank, of a rotary working tank adjacent thereto, a wall across one corner of said melting-tank having an aperture in its lower portion, and forming a vertical conduit, a forehearth between said tanks, a trough forming a portion of said forehearth and extending from said conduit and projecting over said working tank and a common heating-hood for both tanks having a concavity in its front wall, for the purpose described.

In testimony whereof I affix my signature in presence of two witnesses.

MICHAEL J. OWENS.

Witnesses:
E. H. VOSE,
ORRA L. INGLESBY.